(12) United States Patent
Bucklew et al.

(10) Patent No.: US 11,027,365 B2
(45) Date of Patent: Jun. 8, 2021

(54) LASER BEAM DIVERTING APERTURE AND REFLECTION CAPTURE DEVICE

(71) Applicant: Preco, Inc., Somerset, WI (US)

(72) Inventors: James J. Bucklew, Somerset, WI (US); Steve Wenberg, Hammond, WI (US); Corey Jurowski, New Richmond, WI (US); Daniel B. Miller, Roberts, WI (US); Marty Tryba, Somerset, WI (US); Mark Freeborn, River Falls, WI (US)

(73) Assignee: PRECO, INC., Somerset, WI (US)

( * ) Notice: Subject to any disclaimer, the term of this patent is extended or adjusted under 35 U.S.C. 154(b) by 289 days.

(21) Appl. No.: 16/049,402

(22) Filed: Jul. 30, 2018

(65) Prior Publication Data

US 2019/0030643 A1 Jan. 31, 2019

Related U.S. Application Data

(60) Provisional application No. 62/539,269, filed on Jul. 31, 2017.

(51) Int. Cl.
*B23K 26/06* (2014.01)
*H01S 3/00* (2006.01)
*B23K 26/035* (2014.01)

(52) U.S. Cl.
CPC ............ *B23K 26/06* (2013.01); *B23K 26/035* (2015.10); *H01S 3/0071* (2013.01)

(58) Field of Classification Search
CPC .. B23K 26/06; B23K 26/035; B23K 26/0656; B23K 26/064; H01S 3/0071; H01S 3/0064; H01S 3/005
See application file for complete search history.

(56) References Cited

U.S. PATENT DOCUMENTS

| | | | | |
|---|---|---|---|---|
| 5,008,510 A | * | 4/1991 | Koseki | B23K 26/0093 219/121.7 |
| 5,783,793 A | * | 7/1998 | Emerton | B23K 26/067 219/121.71 |
| 2003/0053769 A1 | * | 3/2003 | Schunk | G02B 6/4246 385/93 |
| 2003/0197955 A1 | * | 10/2003 | Carra | B23K 26/06 359/738 |
| 2005/0056628 A1 | * | 3/2005 | Hu | B23K 26/144 219/121.84 |
| 2008/0099452 A1 | * | 5/2008 | Akiyama | B23K 26/1482 219/121.67 |
| 2012/0152918 A1 | | 6/2012 | Li et al. | |
| 2015/0280767 A1 | * | 10/2015 | Ames | B23K 26/10 455/575.8 |
| 2018/0001425 A1 | * | 1/2018 | Sercel | C03B 33/0222 |

* cited by examiner

*Primary Examiner* — Brian W Jennison
(74) *Attorney, Agent, or Firm* — Westman, Champlin & Koehler, P.A.; Z. Peter Sawicki; Amanda M. Prose

(57) ABSTRACT

A laser beam trimming and redirecting device having an aperture therein, the aperture defined by a inner beveled surface for focusing the laser beam directed therethrough and the aperture having an outer beveled surface, or beveled edge, for trimming the laser beam and reflecting the excess energy back towards a source at an angle other than 180 degrees. A reflection capture device positionable upstream of the trimming and redirecting device is configured to absorb the reflected energy instead of the laser beam source or delivery components. The capture device is a liquid cooled device so as dissipate the heat energy absorbed preventing degradation of the device.

20 Claims, 4 Drawing Sheets

FIG. 7
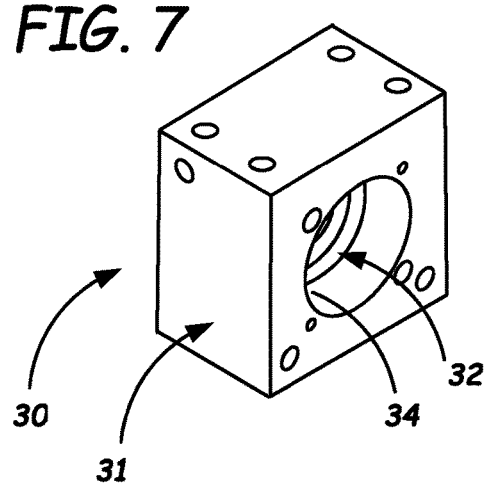
FIG. 8
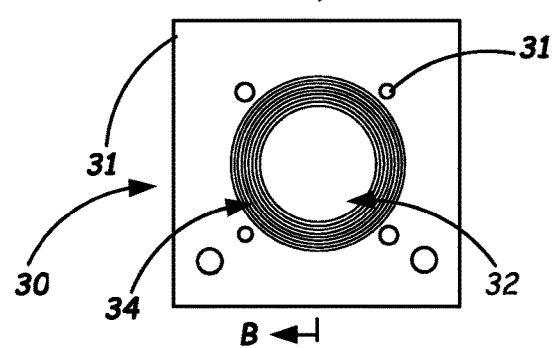
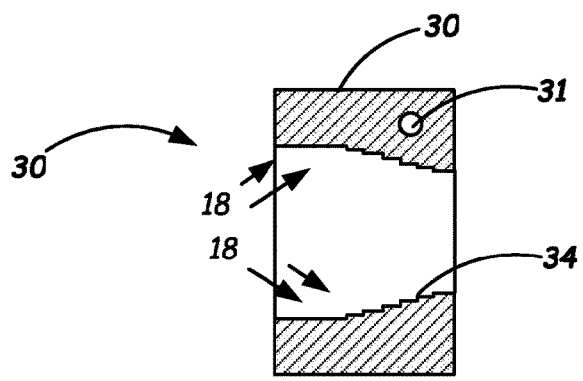
FIG. 9

LASER BEAM DIVERTING APERTURE AND REFLECTION CAPTURE DEVICE

CROSS-REFERENCE TO RELATED APPLICATIONS

The present application is based on and claims the benefit of U.S. provisional patent application Ser. No. 62/539,269, filed Jul. 31, 2017, the content of which is hereby incorporated by reference in its entirety.

BACKGROUND

The present invention relates to steered laser beam systems, and more particularly to a system and method for efficient laser processing of a moving web-based material.

Laser systems typically use high-power laser beams for cutting, slitting, scoring, marking and other related laser processing of web-based materials. In many applications, a fixed laser beam is focused through a lens to cause local vaporization or degradation of the material as the material is moved relative to the focused laser beam.

Apertures have been used in laser systems to trim excess beam energy from around the major portion of a laser beam. Excess laser beam energy or fringe energy exists around the main beam. This energy cannot focus properly onto a workpiece and results in undesirable processing effects so an aperture is used to trim or block this energy from proceeding to the workpiece.

Apertures are also used to standardize a diameter of the laser beam as the diameter can vary based on the laser beam delivery system provided. Such apertures trim excess energy and prevent it from traveling further downstream along the optical path by utilizing a bevel on the downstream side of the aperture while the incident side of the aperture remains flat.

Prior art apertures cause the trimmed energy to be reflected back into and along the upstream beam delivery path and towards the laser beam source. This reflected energy is absorbed by the beam delivery components and the laser resonator itself. This causes the beam delivery components to heat up and expand. This in turn causes misalignment of the laser beam and premature wear of the internal laser components.

SUMMARY

An aspect of the present disclosure relates to a laser processing system configured to reflect and remove excess energy from a laser beam generated during laser processing. The system comprises a laser source and laser beam delivery components and a laser beam trimming and redirecting or trimming device. The beam trimming and redirecting device comprises an aperture for allowing the laser beam of a selected diameter to pass there through to a workpiece. The aperture is defined by an inner beveled surface which focuses the beam energy passing through the aperture. The trimming and redirecting device also has an out beveled surface or beveled edge for trimming and reflecting excess laser beam energy when focusing the beam. The aperture may be aligned or positioned in a path of the laser beam downstream from the laser beam delivery component and upstream of a workpiece.

Each beveled edge is positioned in the path of the laser beam, with the inner beveled edge is configured to focus and direct the laser beam to the workpiece in coordination with the aperture. The outer beveled surface or edge is positioned incident the laser beam during laser processing. Thus, the outer beveled edge reflects back at least some excess energy from the laser beam as the laser beam travels through the aperture to the workpiece.

The laser system may also comprise a capture device positioned upstream of the aperture and near the laser beam delivery components. The capture device is configured to absorb at least some of the excess energy reflected back by the trimming and redirecting device.

Another aspect of the present disclosure relates to a laser beam trimming and redirecting device having an outer surface for diverting excess laser energy from a laser beam generated and used during laser processing various materials. The trimming and redirecting device has an aperture therein that is defined by an inner, continuous, beveled surface (e.g., a ring with an aperture therein). The outer surface of the device is an outer perimeter surface comprising a beveled edge, referred to as an outer beveled surface or edge. The beveled edge is positioned incident a laser beam travel path and the beveled edge is sloped such that the beveled edge reflects excess energy from a laser beam directed through the aperture defined by the beveled edge. The beveled edge is configured to reflect the excess energy, effectively trimming the laser beam that proceeds through the aperture towards the workpiece. The excess energy is reflected along a path that is divergent or otherwise non-parallel to the laser beam energy travel path to the aperture. The laser beam energy travel path is the direction or path of the laser beam from the laser beam generation/directing component to the aperture.

Another aspect of the present disclosure relates to an energy capture device for absorbing the excess energy trimmed from a laser beam during laser processing. The excess energy trimmed from the laser beam is reflected from a beveled surface of a trimming and redirecting device where an aperture in the focus device directs the laser beam along a first beveled surface towards the workpiece. The excess energy reflected back is absorbed by the capture device. The capture device is positioned offset from the laser beam delivery components since the excess energy is reflected at an angle other than 180 degrees. The capture device is comprised of metal, such as aluminum or anodized aluminum and can be further configured with a cooling jacket or cooling channels to remove the heat generated by absorbing the excess energy.

Yet another aspect of the present disclosure relates to a method of reflection and absorption of excess laser energy from a laser beam focused during laser processing and cooling components. The method comprises trimming excess energy from around a major portion of a laser beam generated for laser processing a material and reflecting this excess energy back towards the laser beam directing components along a path that is non-parallel with the path of the laser beam. The method also comprises absorbing this excess reflected back energy with a capture device. The method further provides cooling the capture device to prevent degradation of the capture device.

BRIEF DESCRIPTION OF THE DRAWINGS

FIG. 7 is a perspective view of a capture device for the laser processing system.

FIG. 8 is a top view of the capture device.

FIG. 9 is a cross-sectional view of the capture device taken along line B-B illustrated in FIG. 8.

DETAILED DESCRIPTION

Figure 1A:
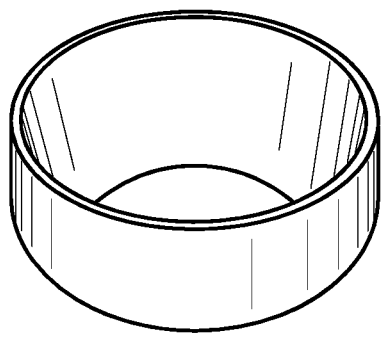
FIGS. 1A-1C illustrate a trimming and redirecting device for a laser processing system of the prior art.

The present disclosure is directed to a laser processing system and devices and methods for managing a substantial amount of excess laser beam energy resulting from focusing a laser beam produced for laser processing various materials.

Generally, "laser processing" refers to cutting, slitting, scoring, marking and the like. All such types of laser processing are equally relevant, and the effect is achieved in the same way. "Moving web" generally refers to any material that can be continuously advanced under the laser beam. More specifically, "moving web" refers to any thin film material such as any plastic or cellulose film, paper or metal foil material. The systems described herein may also be used to laser process various materials including metals, such as metal sheets.

The devices described herein are configured to substantially reduce, to near minimal or trace only, amounts of excess laser energy (e.g., trimmed laser energy) absorbed by laser beam delivery components. The devices herein reflect and absorb excess laser energy to an extent sufficient to reduce heating of the laser beam delivery components. These devices also substantially reduce or eliminate negative effects on laser beam energy control and focusing by substantially preventing laser energy from being reflected back into the laser beam delivery cavity. The devices herein result in improved laser beam delivery component life as thermal expansion and structural weakening of the components is substantially prevented during laser processing.

Prior to installation of the diverting aperture, laser processing encountered issues during production runs. For example, at the beginning of the production run, the material processed properly. However as the production run progressed, the laser beam would not cut the material to the selected depth. In multiple cases it was found that the laser beam was out of alignment, and the various parts of the beam delivery system where hotter than expected. This was traced back to energy reflecting off the standard single beveled aperture being used. The temperature of various beam delivery locations were monitored with the single beveled aperture and then with the diverting aperture disclosed herein for comparison. Temperatures were recorded as high as 238° F. in the system without the diverting aperture. When the diverting aperture described herein was installed, temperatures of components were reduced to as low as about 86° F. or lower. Thus, in a laser system without laser beam diverting aperture and reflection capture device described herein, a laser beam delivery component of about 238° F. was recorded. When the laser beam diverting aperture and reflection capture device described herein was installed in the system, a reduced laser beam delivery temperature was recorded, the laser beam delivery temperature was about 86° F. The devices described herein increase and improve the thermal stability of laser beam delivery and thus laser beam steering (or veering) due to heat input is mitigated.

Figure 1B:
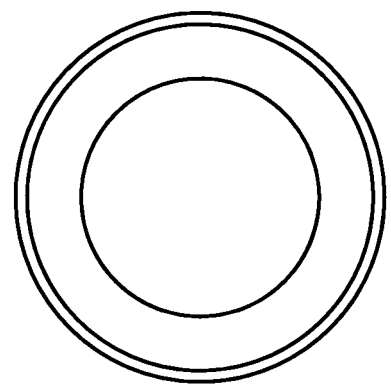
Figure 1C:
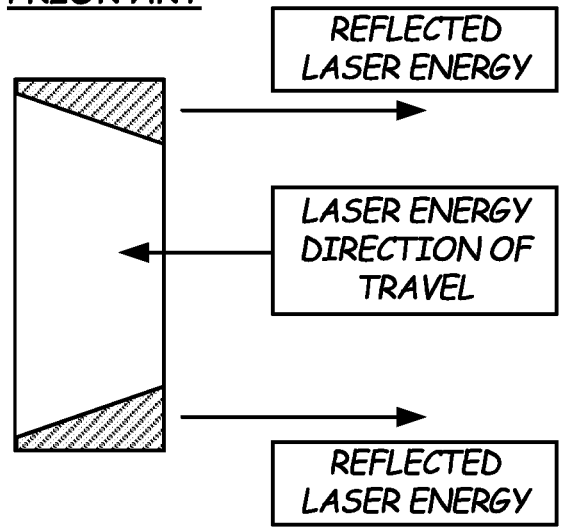

In a laser processing system, a laser source generates a laser beam, which is typically reflected by a fixed mirror and focused by a lens. This laser beam is then directed onto a workpiece (e.g., substrate). The lens focuses the laser beam so that its focal point impinges upon the workpiece. The beam generated may then be directed through an aperture in a trimming device where a surface defining the aperture "trims" the beam (e.g., blocks the excess energy of the beam) and thus controls the diameter of the laser beam directed towards the workpiece based on the dimensions of the aperture itself. The prior art aperture for trimming the laser beam is illustrated in FIG. 1. A controller controls the on-off timing of the laser source to match a set processing pattern. The excess energy that is trimmed, or blocked, is generally reflected directly back towards the laser source. In the device of the present disclosure, the excess energy can be managed and directed so that the laser beam delivery components do not absorb the energy which substantially reduces or even eliminates heating of the internal laser beam generation components. This increases the life of the physical components of the laser system as well as allows for increased precision in maintaining accurate beam alignment and focal point control when laser processing.

Figure 2:
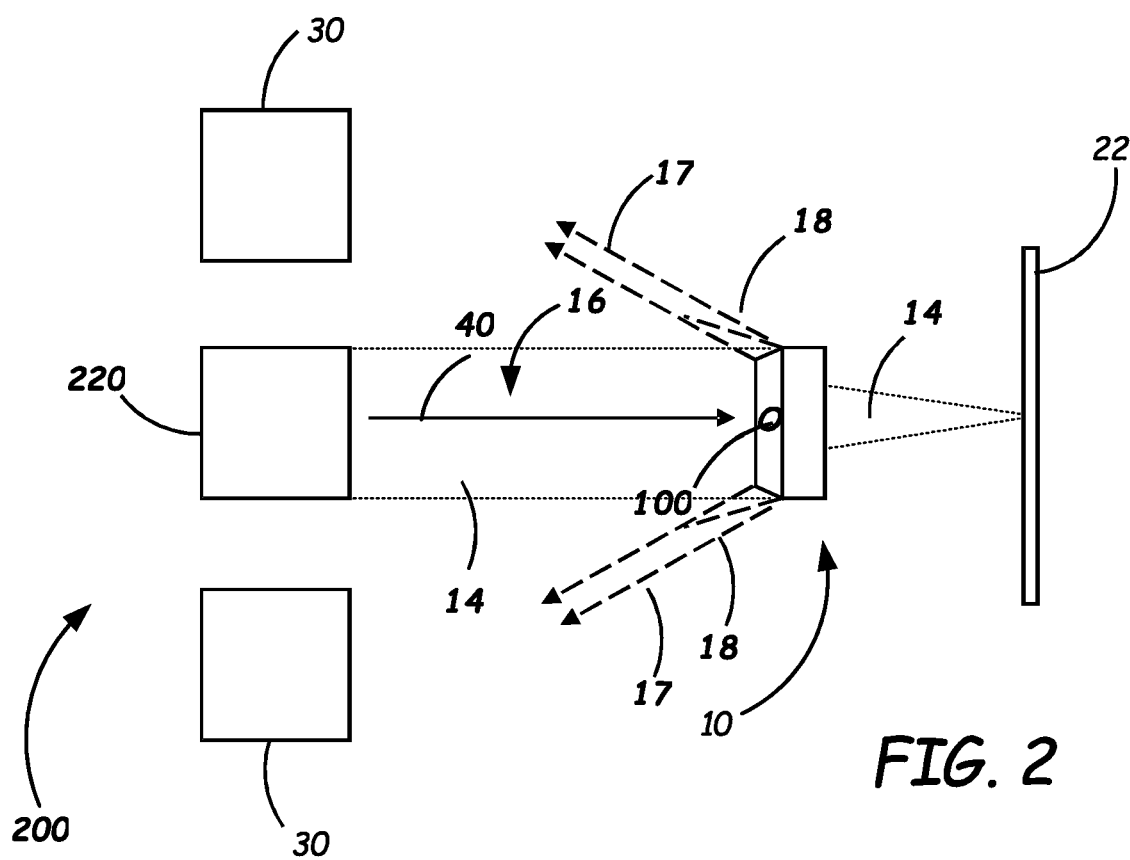
FIG. 2 is a schematic view of a laser processing system having a diverting surface having an aperture and a capture device of the present disclosure incorporated therein.
Figure 3:
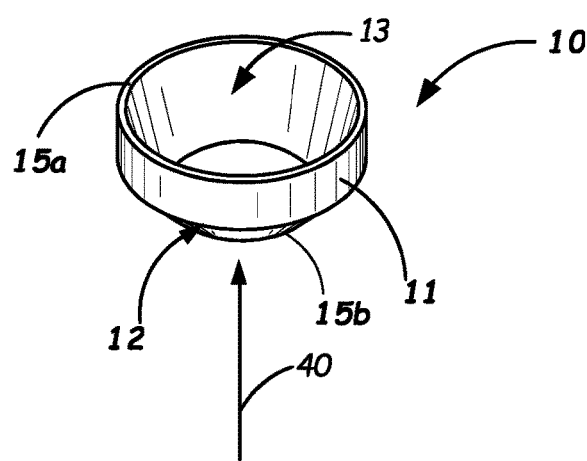
FIG. 3 is a perspective view of a diverting surface having an aperture for a laser processing system.
Figure 4:
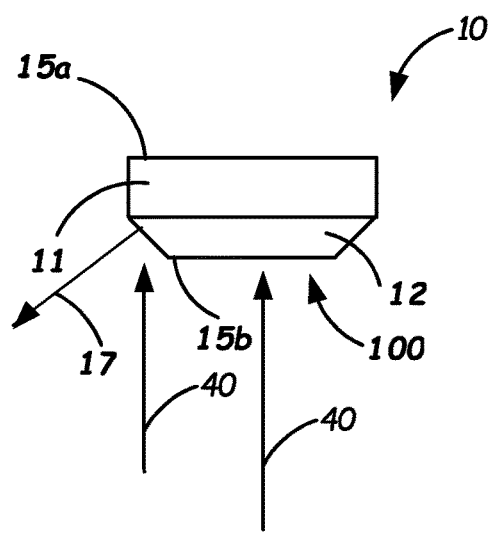
FIG. 4 is a side view of the diverting surface and aperture.
Figure 5:
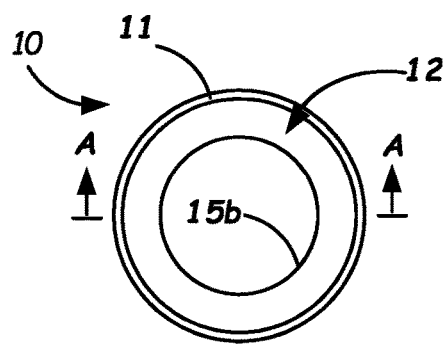
FIG. 5 is a top view of the diverting surface and aperture.

The present disclosure relates to a laser processing system 200 as illustrated in FIG. 2 wherein a laser beam trimming and redirecting device illustrated generally at 10 in FIG. 3 may be incorporated. The trimming and redirecting device 10 has a perimeter surface 11 defining an aperture 100, where the perimeter surface 11 effectively trims away excess energy 18 from a laser beam 14 directed through the aperture 100.

As illustrated in FIG. 2, the laser processing system 200 comprises a laser source which includes laser beam generating components and steering components housed in a cavity, collectively identified as laser beam generating components 220. The laser beam generating components 220 produce and steer a laser beam 214 travelling in the direction of arrow 40, to a work piece 222. In FIG. 2, the laser processing system incorporates a laser beam trimming and diverting device 10 and a plurality of capture devices 30. The laser beam 14 is delivered along a path defined along a first axis 16 that may be normal to a cross section of an aperture 100 of the trimming and diverting device 10.

As illustrated in further detail in FIGS. 3-6, the trimming and redirecting device 10 is an aperture 100 that is a hollow tube or ring having an outer perimeter surface 11 that terminates at one end in an outer beveled surface 12. The aperture 100 also has an inner beveled surface 13 extending away from the aperture 100 opening and terminating with a terminal end of the outer beveled surface 12.

Figure 6:
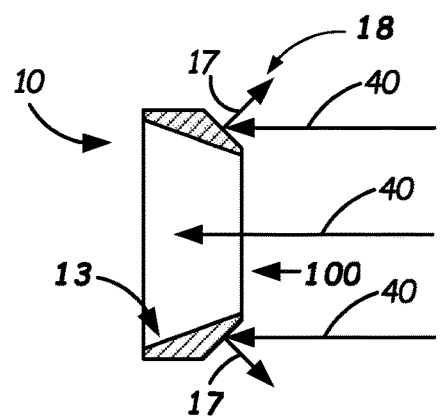
FIG. 6 is a cross-sectional view of the diverting aperture taken along line A-A illustrated in FIG. 5.

The inner beveled surface 13 is an interior surface extending between opposing openings 15a, 15b of the aperture 100 and positioned to slope towards the opening 15a of the aperture 100. For example, as illustrated in FIG. 6, a cross-sectional distance (e.g., diameter) of the device 10 is greater at points approaching opening 15a than at points approaching opening 15b (the beveled surface reduces the inner cross-sectional distance from opening 15a to opening 15b). The inner beveled surface 13 acts to focus and/or direct the laser beam energy passing through the aperture 100.

The outer beveled surface 12 is provided on a laser incident side of the device 10 and thus upstream of the opening 15a according to the direction of travel of a laser beam as illustrated by arrow 40 through the aperture 100. The outer beveled surface 12 is a conical surface extending around a circumference of perimeter 11 of aperture 100. The outer beveled surface 12 is a beveled edge positioned near opening 15b and is considered a conical surface with respect to the outer perimeter 11 of the trimming and redirecting device 10.

Referring back to FIG. 6, the outer beveled surface 12 trims, diverts and reflects the trimmed excess energy laser energy 18 which is reflected in the direction of arrows 17. The angle or slope of the outer beveled surface 12 allows the excess energy 18 to be reflected from the device 10 at an angle and thus away from the upstream beam delivery components 220. The outer beveled surface 12 reflects the trimmed energy along a path travelling upstream at an angle other than 180 degrees. Absorption by the laser beam delivery components 220 is substantially reduced or eliminated as the outer beveled surface 12 is configured to reflect the excess laser beam energy 18 back along a path that is non-parallel to (away from) the laser beam path along axis 16 upstream of the trimming and redirecting device 10 as illustrated by arrows 17. Thus, the outer beveled surface 12 is configured to prevent the excess energy 18 from being directed back into the laser beam delivery components 220 and/or into the laser cavity.

Referring to FIG. 6, the outer beveled edge 12 is sloped towards the laser beam delivery components when installed in the laser processing system 200. That is, the slope is facing the direction of travel of the laser energy. In the figures, the direction of travel of the laser energy is illustrated by arrows 40. The outer beveled edge 12 thus reflects the excess energy back along a second axis as illustrated by arrows 17 that diverges from the first axis 16 illustrated in FIG. 2. The outer beveled surface 12 may be angled with respect to direction of travel of the laser beam 40 along the first axis 16 at an obtuse angle so as to reflect excess energy back at an acute angle as best illustrated in FIG. 6.

For example, the outer beveled surface 12 may be angled away with respect to the perimeter surface 11 at an angle that is between about 30 degrees and about 60 degrees. As illustrated in FIG. 6, the outer beveled edge 12 may be angled at an angle of about 45 degrees with respect to the perimeter surface.

If the energy is reflected back to the laser beam delivery components 220 and/or the laser cavity, this results in overheating of the laser cavity and heat expansion and/or warping of the components. It is believed that the cavity and the components thermally expand and the thermal expansion of the beam delivery components creates positional stability issues in producing and steering the laser beam. The thermal expansion also weakens the components and results in premature wear and tear and early replacement of the laser beam delivery component and laser cavity surfaces. As the laser beam delivery components 220 will not subjected to this excess energy, laser beam misalignment is prevented and the lifetime of the laser beam delivery components 220 is extended.

The aperture 100 and the inner beveled surface 13 then allow the laser beam having a selected beam diameter to pass through the trimming and redirecting device 10 to the work piece 22 for laser processing. As discussed further below, the outer beveled surface 12 concurrently reflects the excess energy 18 away from the laser beam delivery components 220 and this excess energy 18 may be reflected back towards and into a capture device 30 configured to absorb the redirected and reflected laser beam energy 18.

In higher energy laser systems or heavy/high duty laser processing systems where the heat generated during laser processing is relatively high and the system components are prone to overheating, the laser beam trimming device 10 may be comprised of copper or a similar reflective metal material or combination thereof. The device 10 is not a mirror but may function as a mirror to the extent that light is reflected back from the surface of the device 10.

The capture device(s) shown at 30 in FIG. 2 are illustrated in further detail in FIGS. 7-9. As the excess energy 18 is reflected back upstream in the laser processing system 200, the capture device 30 is configured to absorb substantially all of the excess energy reflected 18. The reflected energy 18 needs to be removed from the laser system 200 and one method of doing so may comprise positioning the capture device 30 (or devices 30) near, but offset from, the laser beam delivery components 220 or otherwise surrounding the laser beam delivery components 220. The capture device(s) 30 is/are configured to absorb excess energy reflected from any or all points along the outer beveled edge 12 of the laser beam trimming device 10. The capture device 30 can then be positioned in the path of the reflected excess energy 18 and substantially most if not all of the energy 18 reflected is absorbed by the capture device 30.

Referring to FIGS. 7-9, the capture device 30 may be an air or liquid cooled capture device 30. Thus, device 30 captures the reflected back laser energy 18 and is concurrently liquid cooled to minimize deformation and/or degradation of the capture device 30 due to heating resulting from the absorption of the excess energy 18. The capture device 30 is a housing 31 having an aperture 32 therein. The aperture 32 in the housing is defined by a stepped or grooved interior perimeter surface 34. This interior perimeter surface 34 defines the dimension of the aperture 32. The grooved interior perimeter surface 34 comprises a series of concentric grooves 36 which aid the device 30 in capturing substantially all of the deflected energy 18 entering and/or contacting the capture device 30. The grooves 36 prevent imparting a deflection angle into the beam of reflected energy 18 and thus eliminate refraction of the reflected back energy beam 18.

The housing 31 may also be configured with or comprise a water jacket or one or more water channels 33 or air flow passageways (not shown) within the device 30 and in the housing 31 surrounding the aperture. The water jacket or one or more water channels are configured to keep the capture device 30 cooled. Thus, the device is liquid cooled by the water cooling system is configured to remove the energy (e.g., heat) absorbed by the device 30 during laser processing.

The capture device is also configured with one or more connection apertures (not shown) allowing the device 30 to be installed around or near the laser beam delivery components 220.

The capture device 30 is comprised of a material configured to absorb energy and heat while also being easily cooled. For example, the device 30 is comprised of anodized aluminum or black anodized aluminum.

Although the present disclosure has been described with reference to preferred embodiments, workers skilled in the art will recognize that changes may be made in form and detail without departing from the spirit and scope of the disclosure.

The invention claimed is:

1. A laser processing system configured to reflect and remove excess energy from a laser beam generated during laser processing, the laser processing system comprising:
  a laser source and laser beam delivery component;
  a laser beam trimming and redirecting device having an aperture therein, the device positioned in a path of the laser beam downstream from the laser beam delivery component and upstream of a workpiece wherein the trimming and redirecting device comprises an outer perimeter providing an exit opening for the laser beam having a first cross-sectional dimension, an inner beveled surface extending substantially continuously from the exit opening to an inlet opening of the aperture for entry of the laser beam and an outer beveled surface extending from the outer perimeter and providing an inlet to the aperture having a second cross-sectional dimension less than the first cross sectional dimension such that inlet opening is smaller than the exit opening, the beveled surfaces defining the aperture and each beveled surface positioned in the path of the laser beam such that the aperture and the inner beveled surface cooperate to focus the laser beam and direct the laser beam to the workpiece while the outer beveled surface reflects back at least some excess energy trimmed from the laser beam as the laser beam travels through the aperture to the workpiece; and a capture device positioned upstream of the trimming and redirecting device and near the laser beam delivery component and the capture device configured to absorb at least some of the excess energy reflected back by the trimming and redirecting device.

2. The system of claim 1, wherein the outer beveled surface is configured with a vertical angle sufficient to reflect the excess laser beam energy along a travel path having a first axis that is non-parallel with a second axis of the laser beam path entering the aperture.

3. The system of claim 2, wherein the vertical angle of the outer beveled surface is in the range of about 30 degrees to about 60 degrees with respect to the perimeter surface of the device.

4. The system of claim 3, wherein the vertical angle of the outer beveled surface is about 45 degrees with respect to the perimeter surface of the device.

5. The system of claim 1, wherein the trimming and redirecting device is comprised of a metal.

6. The system of claim 1, wherein capture device comprises an aperture therein defined by a surface configured for absorbing reflected energy.

7. The system of claim 6, wherein the surface defining the aperture is a grooved surface for increasing the excess energy absorbed by the capture device.

8. The system of claim 1, wherein the capture device is liquid cooled for dissipating the energy absorbed by the device.

9. The system of claim 8, wherein the capture device comprises a water jacket for cooling the device.

10. The system of claim 8, wherein the capture device comprises one or more water channels for cooling the device.

11. They system of claim 1, wherein the capture device is comprised of black anodized aluminum for absorbing the reflected laser beam energy.

12. A method of reflecting and absorbing excess laser energy from a laser beam generated during laser processing, the method comprising:

producing a laser beam and delivering a laser beam through into and through an aperture in a focusing device to a workpiece;

shaping the laser beam diameter by passing the laser beam through the aperture having an interior beveled surface along its length, the aperture positioned in a path of the laser beam and downstream from the laser beam delivery component and upstream of the workpiece;

reflecting back excess energy from the laser beam with a beveled edge defining an external surface of an inlet of the aperture, the beveled edge being positioned incident the laser beam;

capturing the reflected excess energy with a capture device positioned upstream of the focusing device and near a laser beam delivery component wherein the device is configured to absorb at least some of the excess energy reflected back towards the laser beam delivery component by the aperture.

13. The method of claim 12, and further comprising cooling the capture device with a liquid cooling system comprising at least one of a liquid cooling jacket or one or more liquid cooling channels.

14. The method of claim 12, wherein the beveled edge is an acute vertical angle with respect to a perimeter surface of the trimming and redirecting device.

15. The method of claim 14, wherein the beveled edge is a vertical angle of about 45 degrees for reflecting the excess energy back along a path that is non-parallel with the laser beam path through the aperture.

16. The method of claim 12, and positioning the capture device near or around the laser beam delivery component for receiving the energy reflected directly from the beveled edge as the beveled edge is configured to reflect the energy back at an angle other than 180 degrees.

17. A laser beam trimming and redirecting device for diverting excess laser energy from a laser beam generated for laser processing, the trimming and redirecting device having an aperture therein and the device comprising an outer perimeter providing an exit opening for the laser beam and having a first cross-sectional dimension, an inner beveled surface extending substantially continuously from the exit opening to an inlet opening of the aperture for entry of the laser beam, and an outer beveled surface extending from the outer perimeter and providing an inlet to the aperture having a second cross-sectional dimension less than the first cross sectional dimension such that the inlet opening is smaller than the exit opening, the beveled surfaces defining the aperture and each beveled surface positionable in the path of the laser beam such that the aperture and the inner beveled surface cooperate to reflect excess energy from the laser beam passing through the aperture along a reflection path that is non-parallel with a travel path of the laser beam through the aperture.

18. The trimming and redirecting device of claim 17 comprised of a metal.

19. The trimming and redirecting device of claim 17 and further comprising an energy capture device for absorbing excess laser energy during laser processing wherein the excess energy absorbed is energy redirected from the beam trimming and redirecting device positioned in the laser beam travel path and spaced apart from the capture device, and wherein the capture device comprises a housing having a grooved surfacing defining an aperture therein and is comprised of anodized aluminum.

20. The trimming and redirecting device of claim 19 wherein the capture device further comprises a liquid cooling system for cooling the device while the device absorbs the excess laser energy in the form of heat wherein the liquid cooling device may comprise one or more of a liquid cooling jacket or one or more liquid cooling channels therein.

\* \* \* \* \*